United States Patent [19]
Brown et al.

[11] Patent Number: 6,019,338
[45] Date of Patent: Feb. 1, 2000

[54] TILT STAND FOR DESKTOP TERMINAL

[75] Inventors: Michael Brown, Orleans; Ernest R. Dynie, Nepean; John I. Johnson, Kinburn; Donald T. Chadwick, Nepean, all of Canada

[73] Assignee: Nortel Networks Corporation, Montreal, Canada

[21] Appl. No.: 09/028,520

[22] Filed: Feb. 23, 1998

[51] Int. Cl.[7] .................................................. A47G 29/00
[52] U.S. Cl. ........................................ 248/371; 379/435
[58] Field of Search ..................................... 248/393, 133, 248/371, 454, 456, 457; 379/419, 427, 435, 440

[56] References Cited

U.S. PATENT DOCUMENTS

| | | | |
|---|---|---|---|
| 4,797,916 | 1/1989 | Kojima | 379/435 X |
| 5,086,466 | 2/1992 | Gumb et al. | 379/440 |
| 5,121,427 | 6/1992 | Gumb et al. | 379/419 X |
| 5,187,743 | 2/1993 | Gumb et al. | 379/435 X |
| 5,784,456 | 7/1998 | Carey et al. | 379/419 |

*Primary Examiner*—Ramon O. Ramirez

[57] ABSTRACT

The angle of a desktop terminal such as a telephone can be easily adjusted with the combination of a stand and a tilt unit control device integrated within a lower surface of the terminal. The terminal is pivotally connected to the stand. The terminal is held at a particular angle by engagement of a tooth on the tilt unit control device, with a serration on a rear surface of the tilt unit of the stand. To change the angle of the terminal, the user depresses a handle of the tilt unit control device which pivots the tooth of the device away from the tilt unit thereby disengaging the tooth from the serration on the tilt unit. The user then pivots the terminal to the preferred angle and depresses the handle, thereby engaging the tooth with a different serration on the tilt unit.

51 Claims, 9 Drawing Sheets

TILT STAND FOR DESKTOP TERMINAL

RELATED APPLICATION

This application is related to subject matter to two U.S. applications filed on even date. The first related application is entitled DISPLAY-BASED ADD-ON MODULE, inventors J. Johnson, P. Koens, D. Boggia and applicant's reference is 71493-327. The second related application is entitled PLUG-IN ACCESSORIES, inventors E. Dynie, P. Koens, J. Johnson and applicant's reference is 71493-331.

FIELD OF THE INVENTION

The invention relates to desktop terminals and is particularly concerned with a tilt stand and a desktop terminal adapted for engagement with a tilt stand.

BACKGROUND OF THE INVENTION

A user of a desktop terminal such as a telephone terminal, for example, may desire to change the angle of the terminal relative to the table or structure on which the terminal sits to optimize the angle of the keys on the terminal or to reduce glare on the terminal's visual display. Currently, some desktop terminals allow the user to change the angle of the display alone without being able to adjust the angle of the keys or other portions of the terminal. Because different individuals have different preferences relating to the angle of the keys on the terminal, it would be desirable for a user to be able to adjust the angle of the entire terminal.

Other desktop terminals currently allow the user to adjust the angle of the entire terminal to one of two or three different pre-determined angles. However, these terminals typically require the user to remove the terminal from a terminal stand and replace the terminal at a different angle setting. Accordingly, these devices require two hands to change the angle of the terminal and due to their design, are not suitable for virtually effortless changing of the angle of the terminal.

It would be desirable to be have a device allowing easy, one-handed angle manipulation of the terminal while also allowing the user to select any one of a wide range of possible angles.

SUMMARY OF THE INVENTION

It is an object of the invention to obviate or mitigate one or more of the above identified disadvantages.

According to a first broad aspect, the invention provides a combination of a desktop terminal and a tilt stand allowing adjustment of the angle of the terminal, wherein the tilt stand comprises: a base having a front edge and a rear edge; a tilt unit extending upwardly from the base; friction means extending along the tilt unit; wherein the terminal comprises: a body having an upper surface, a lower surface, a front edge and a rear edge; the body being pivotally connected to the base proximate to the front edge of the housing and the front edge of the base; the terminal further comprising: an indentation in the lower surface receiving an upper portion of the tilt unit; a locking member engageable with the friction means to retain the housing at a plurality of pivoted positions; and a manually operable actuating member for selectively operating the locking member to cause the locking member to retain the body at a desired one of the plurality of pivoted positions.

According to another broad aspect, the invention provides a tilt stand for use in combination with a desktop terminal of the type comprising a body having an upper surface, a lower surface, a front edge and a rear edge, an indentation in the lower surface, a locking member for retaining the housing at a plurality of pivoted positions, and an actuating member for selectively operating the locking member to cause the locking member to retain the body at a desired one of the plurality of pivoted positions, wherein the tilt stand comprises: a base having a front edge and a rear edge; a tilt unit extending upwardly from the base and having an upper portion for reception in the indentation in the terminal; friction means extending along the tilt unit for engagement by the locking member; the front edge of the base being pivotally connectable to the front edge of the terminal.

According to yet another broad aspect, the invention provides a desktop terminal for use with a tilt stand allowing adjustment of the angle of the terminal, wherein a lower surface of the terminal is adapted to cooperate with a projecting portion of the tilt stand and the lower surface comprises a housing for a tilt stand control device, the tilt stand control device having a locking member engageable with the projecting portion of the tilt stand and a manually operable actuating member for selectively operating the locking member to retain the terminal at a desired one of a plurality of pivotable positions.

Advantages of the invention include allowing the user to select one of a large range of possible desktop terminal angles and to easily change the angle of the desktop terminal with one hand.

BRIEF DESCRIPTION OF THE DRAWINGS

Preferred embodiments of the invention will now be described with reference to the attached drawings in which

FIG. 3b is a front perspective view of the stand of FIG. 3a;

FIG. 3c is a side view of the stand of FIG. 3a;

FIG. 4b is a perspective view of the underside of the terminal of FIG. 4a;

FIG. 5a is a top perspective view of a tilt stand control device;

FIG. 5b is a bottom perspective view of the tilt stand control device of FIG. 5a;

FIG. 5c is a side view of the tilt stand control device of FIG. 5a;

DETAILED DESCRIPTION OF THE PREFERRED EMBODIMENTS

Figure 1:
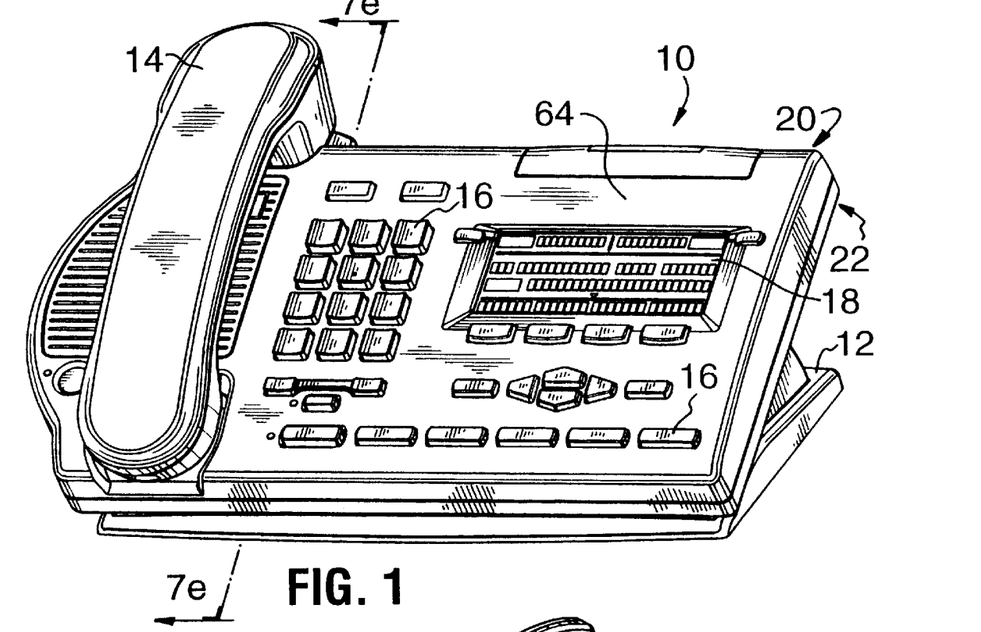
FIG. 1 is front perspective view of a telephone terminal on a stand in accordance with an embodiment of the present invention.

Referring to FIG. 1, there is shown a front perspective view of a desktop terminal 10 mounted on a stand 12, both of which are preferably made of molded plastic. The terminal 10 can have any number of different features and uses. The terminal 10 shown in FIG. 1, for example, is a telephone terminal having, amongst other elements, a handset 14, various keys 16, a display 18, a body having an upper surface 20 and a lower surface 22.

Figure 2:
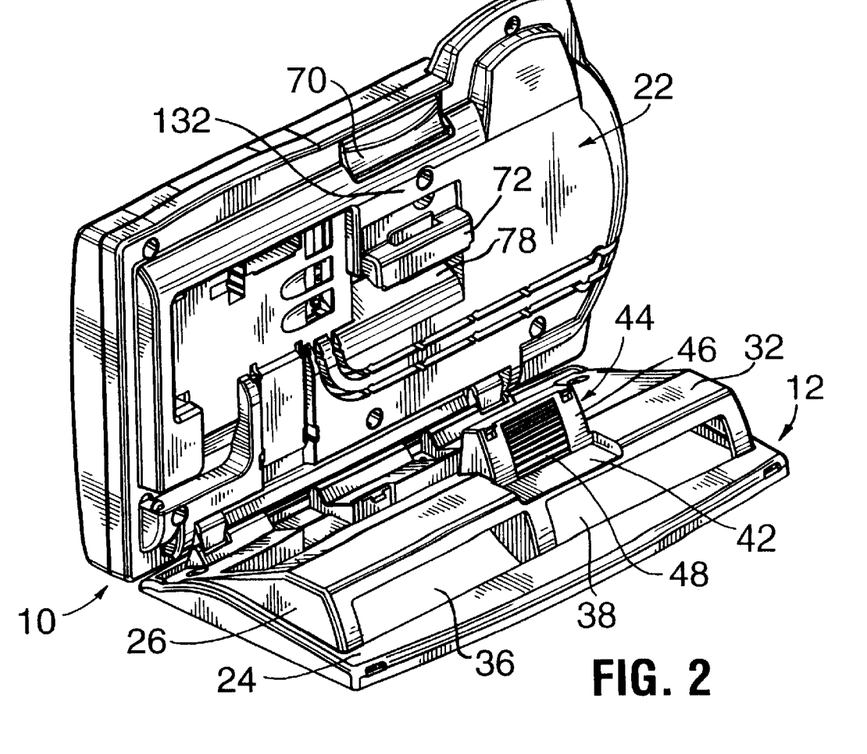
FIG. 2 is a rear perspective view of the terminal and stand of FIG. 1 in a pre-assembled position.

Referring to FIG. 2, there is shown a rear perspective view of the terminal 10 and stand 12, with the terminal 10 raised higher than the terminal 10 shown in FIG. 1. FIG. 2 shows the lower surface 22 of the terminal 10 and the stand 12.

Figure 3A:
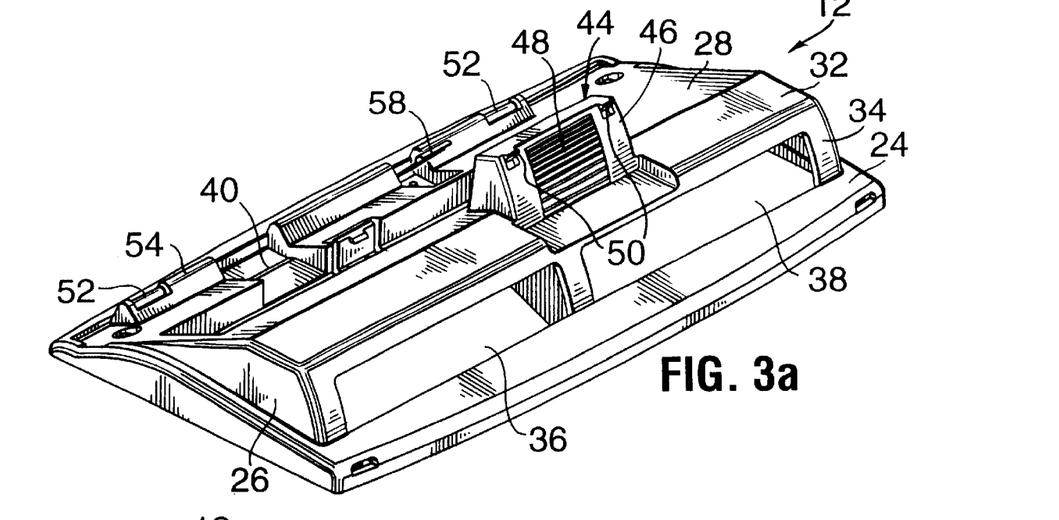
FIG. 3a is a rear perspective view of the stand of FIG. 2.
Figures 3B, 3C:
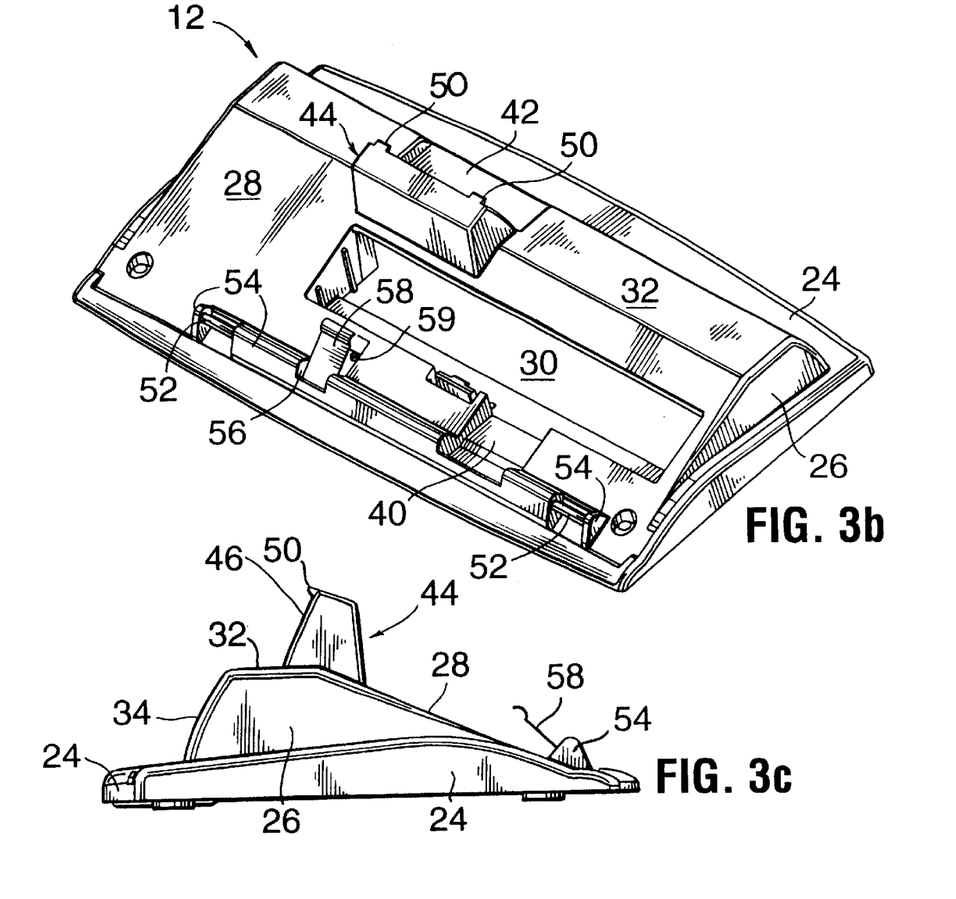

The stand 12 is shown separately and in greater detail in FIGS. 3a, 3b and 3c, which are rear perspective, front perspective and side views, respectively. The stand is supported around its lower perimeter by a base 24. A primary raised portion 26 is shown having a sloping surface 28 rising from the front of the base 24 and having one large opening 30 formed therein, a flat surface 32 at the top of the primary raised portion 26, and a rear, nearly vertical, slightly convex surface 34 having two openings 36, 38 formed therein.

The two rear openings 36, 38 are optionally provided for the introduction of accessory connection modules (not shown) which may be used to increase the number of features available with the terminal. The front opening 30 and adjacent interface indentation 40 are optionally provided for the introduction of an interface device (not shown) between the accessory connection modules and the terminal 10.

The flat surface 32 optionally has a relatively centrally located indentation 42. Projecting generally upwardly from a rear edge of the indentation is a tilt unit 44. As shown in the side view of FIG. 3c, the rear surface 46 of the tilt unit 44 is preferably curved upwardly and slightly forwardly. As shown in FIG. 3a, the rear surface 46 of the tilt unit 44 has a number of horizontal, parallel, serrated sections 48 extending from near the top of the tilt unit 44 to the base of the tilt unit 44. Preferably, the spacing between adjacent recesses or serrations increases from top to bottom. Preferably, as well, at or near the top of the tilt unit 44 are two stops 50, one on each side of the serrations 48, projecting rearwardly.

Near the front of the stand 12 are preferably two pivot rods 52, spaced apart and each located relatively near to opposite sides of the stand 10. The pivot rods 52 are raised and supported by projecting portions 54. The projecting portions 54 project upwardly from the stand 12 and preferably extend most of the way across the front portion of the stand 12.

Optionally, as shown in FIG. 3b, a spring-receiving indentation 56 is formed relatively centrally within the projecting portion 54 and extends into the adjacent primary raised portion 26. A spring 58 may be placed within the spring-receiving indentation 56. The spring 58, as partially shown in FIGS. 3b and 3c, is preferably formed of a single piece of flexible metal angled to created a lower flat section (not shown) and an upper section, slightly downwardly bent near an end. The spring 58 may be adhered to the floor of the spring-receiving indentation 56 by heat staking (where one or more plastic projections 59 from the floor of the indentation, which are projected through corresponding holes in the lower flat section of the spring (not shown), are melted to the hold the spring 58 in place.)

Figure 6A:
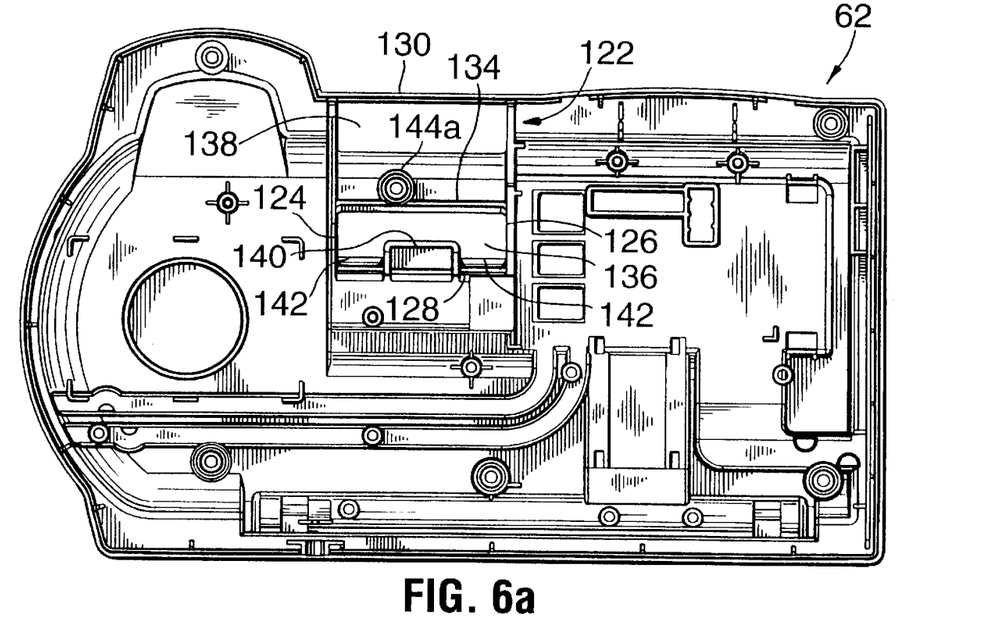
FIG. 6a is a plan (or top) view of a portion of the underside of the terminal of FIG. 2 with the tilt stand control device removed for clarity.

The terminal 10 is formed as two molded halves joined by screws 60. The upper half defines an upper surface 20 and the lower half defines the lower surface 22. The faces of the upper surface 20 and the lower surface 22 which face each other when connected will be referred to as the inner face (not shown) of the upper surface 20 and the inner face 62 of the lower surface 22, as shown in FIG. 6a. The other two faces will be referred to as the outer face 64 of the upper surface 20 and the outer face 66 of the lower surface 22.

Figure 4A:
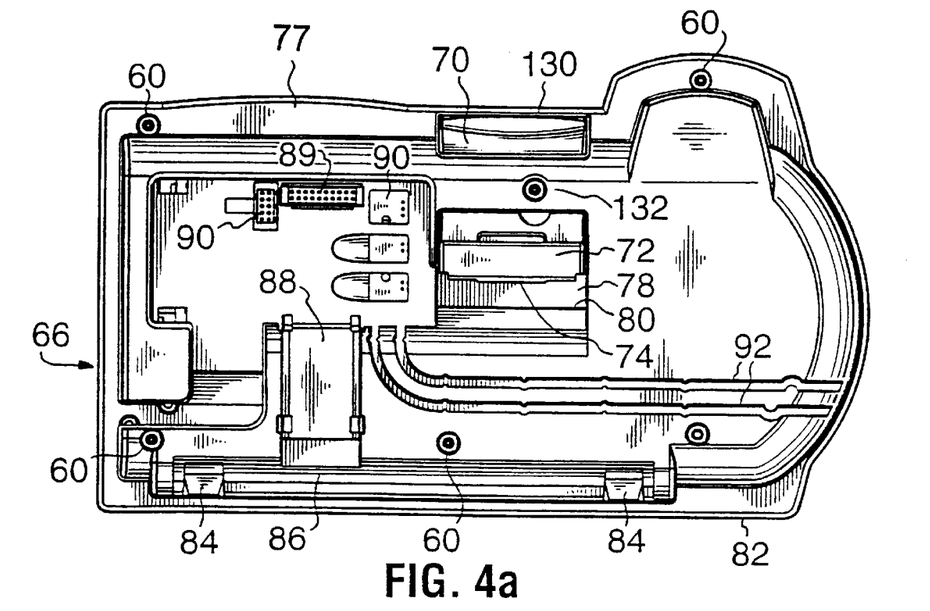
FIG. 4a is plan view of the underside of the terminal of FIG. 2.
Figure 4B:
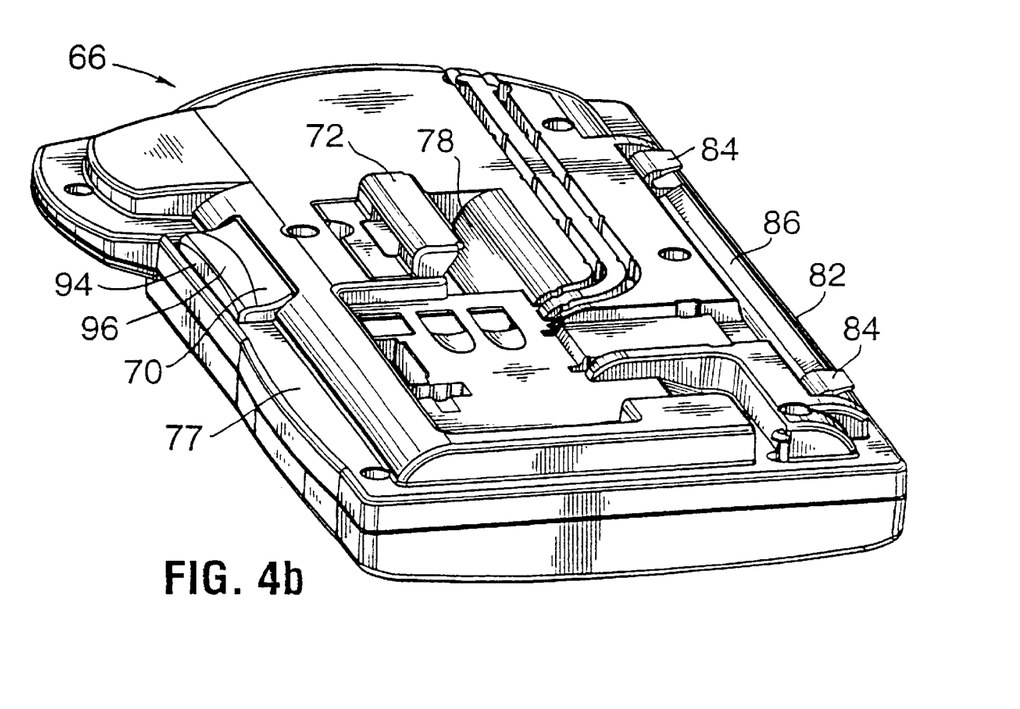

As shown in FIGS. 2, 4a, and 4b, the lower surface 22 of the terminal 10 has many indentations and several projections. The lower surface 22 has, projecting outward therefrom and near its rear surface, and preferably located relatively centrally between the left and right edges of the terminal, an integrated tilt-stand control device 68, with an actuating member or handle portion 70 and a locking member 72. The locking member 72 has one or more teeth 74 projecting forwardly. In the preferred embodiment shown in FIGS. 4a and 5a, the locking member has two outer teeth 76 and one central tooth 74 extending beyond the outer teeth 76.

As shown in FIGS. 4a and 4b, the outer face 66 of the lower surface 22, adjacent the periphery of the lower surface preferably has a depressed region 77. The depressed region 77 allows some of the handle portion 70 of the tilt stand control device 68 to project outwardly from the outer face 66 of the lower surface 22.

Within the lower surface 22 of the terminal 10, just forward of the locking member 72 of the tilt-stand control device 68, is a tilt unit receiving indentation 78, having a length and a width the same as or greater than the length and width of the tilt unit 44 on the stand 12. The distance from the central tooth 74 of the tilt stand control device 68 to the floor of the tilt unit receiving indentation 78 is at least approximately the height of the tilt unit 44, as shown in the cross-sectional view of FIG. 7e. Preferably, a forward wall 80 of the tilt unit receiving indentation 78 is contoured to conform to the angle, if any, of a forward wall of the tilt unit.

Near a forward edge 82 of the lower surface 22 of the terminal 10 are two forwardly projecting pivot prongs 84, which are generally C-shaped in cross-section, as shown in FIG. 4b. The pivot prongs 84 project from a projecting portion receiving indentation 86 which receiving indentation 86 is shaped to mate with the projecting portion 54 of the stand 12, as shown in the cross-sectional view of FIG. 7e.

The lower surface 22 of the terminal 10 optionally has an interface indentation 88 for guiding the interface device (not shown), if one is housed within the stand 12. The lower surface 22 also optionally has an input connector 89 to connect with an output connection (not shown) of the interface device. Other input connectors 90 may be provided to interface with other devices. Various indentations 92 may also be provided for routing wires (not shown).

Referring to FIGS. 2, 4a, 4b, 5a, 5b and 5c, the tilt stand control device 68 will be described in detail. The tilt stand control device 68 is shown alone in top perspective, bottom perspective and side views, respectively, in FIGS. 5a–5c. The surface of the tilt stand control device 68 shown in FIGS. 2, 4a, 4b and 5a will be referred to as the top surface. The locking member 72 will be referred to as the forward portion. As shown in FIGS. 2, 4a and 4b, when the tilt stand control device 68 is integrated within the lower surface 22 of the terminal 10, a portion of the tilt stand control device, the portion between the handle portion 70 and the locking member 72, is hidden behind the lower surface 22 of the terminal 10.

Figures 5A, 5B, 5C:
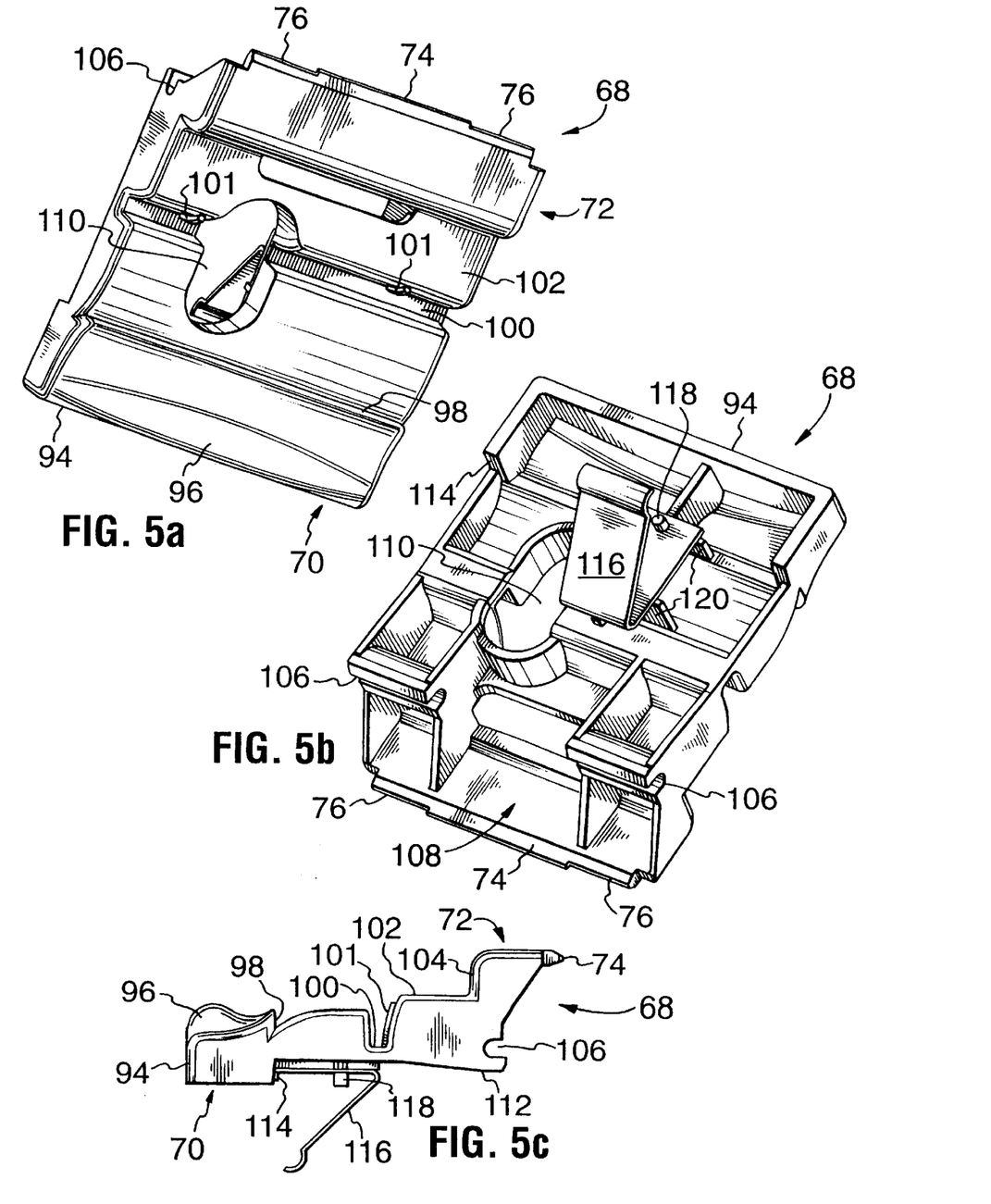

Referring to FIGS. 4b and 5a as well as the side view of the tilt stand control device 68 shown in FIG. 5c, the handle portion 70 forms an outwardly curved projection from near its rear end 94 in which the sides of the device 68 from near the rear end 94 curve outwardly towards the highest portion of the curved projection to form a handle projection 96. Forward of the handle projection 96, the device 68 preferably gently slopes downwardly and then gently slopes upwardly again. Moving forward, there is a trough 98, which gradually slopes upwardly. Approximately mid-way along the length of the tilt stand control device 68 is an indentation 100. The forward surface of the indentation 100 preferably has one or more ribs 101 as shown in FIGS. 5a and 5c. Forward of the indentation is a raised generally flat portion 102 followed by a portion 104 which rises generally vertically upwardly which in turn is followed by the locking member 72 which projects horizontally forwardly terminating in the relatively thin central tooth 74, which is preferably the forwardmost and outermost portion of the tilt stand control device 68.

Below and to the rear of the tooth 74 on the forward surface of the tilt stand control device are two pivot indentations 106, as seen in FIGS. 5b and 5c. Between the two pivot indentations 106 is a gap 108.

As shown in FIGS. 5a and 5b, there is an oval bore 110 extending from the bottom to the top surface of the device 68.

As shown in the side view of FIGS. 5c, a bottom surface 112 of the device 68 is mostly flat, having an optional step portion 114 for greater support. Projecting from the bottom surface 112 of the tilt stand control device 68 is a spring 116, which preferably is similar to the spring 58 described above. The spring 116 may be attached to the bottom surface 112 of the tilt stand control device 68 by heat staking (by melting heat staking pins 118 protruding from the bottom surface 112 of the device 68, as described above). As shown in FIG. 5b, the spring 116 is supported on spring support bars 120, with the heat staking pins 118 protruding from the bars 120.

Figure 6B:
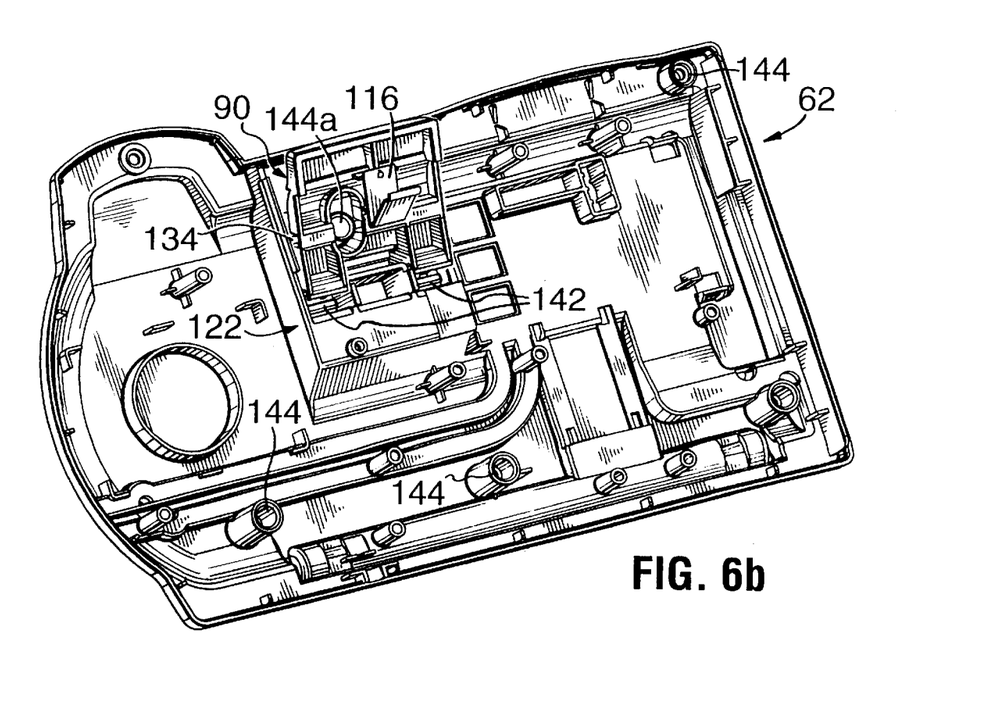
FIG. 6b is a perspective view of the underside of the terminal of FIG. 6a with the tilt stand control device partially inserted.

As shown in FIG. 6a, the inner face 62 of the lower surface 22 of the terminal 10 houses the tilt stand control device 68 in a control device housing 122. The housing 122 has a left wall 124, a right wall 126, a front wall 128 and a rear wall 130. As can be inferred from FIGS. 4a and 6a, approximately half-way between the front wall 128 and the rear wall 130 of the housing 122, is a stop support bar 132 which is part of the outer face 66 of the lower surface 22 of the terminal 10. As shown in FIG. 4a, the stop support bar 132 hides the portion of the tilt stand control device 68 between the handle portion 70 and the locking member 72, when the upper surface 20 and the lower surface 22 of the terminal 10 are connected. Preferably, as shown in FIGS. 6a and 6b, a projection wall 134 extends from front edge of the stop support bar 132 away from the outer face 66 of the lower surface 22. Between the stop support bar 132 and the front wall 128 of the housing 122 is a forward opening 136 of the housing 122, through which the locking member 72 of the tilt stand control device 68 protrudes. Between the stop support bar 132 and the rear wall 130 of the housing 122 is a rear opening 138 of the housing 122 through which the handle portion 70 of the tilt stand control device 68 protrudes.

Figure 6C:
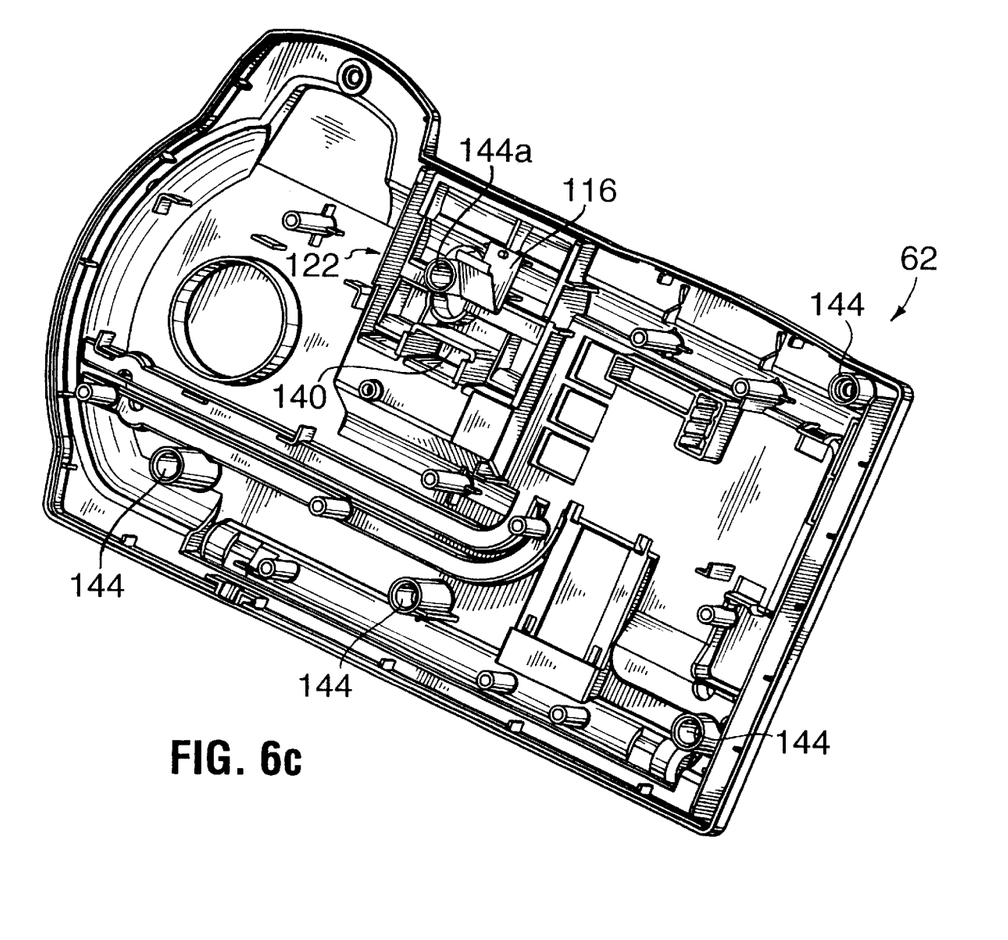
FIG. 6c is a perspective view of the underside of the terminal of FIG. 6a with the tilt stand control device in place.

Preferably, as shown in FIGS. 6a and 6c, a rectangular shaped portion 140, centrally located on the front wall 128 of the housing 122, extends rearwardly from the front wall 128 and preferably also extends from the inner face 62 to the outer face 66 of the lower surface 22 of the terminal 10. A pivot axle 142, parallel to and separated from the front wall 128 of the housing 122, extends from one wall of rectangular shaped portion 140 to the left wall 124 of the housing 122. Similarly, another pivot axle 142, parallel to and separated from the front wall 128 of the housing 122, extends from the opposite wall of the rectangular shaped portion 140 to the right wall 126 of the housing 122. The pivot axles 142 are preferably located relatively close to the outer face 64 of the lower surface 22.

As seen in FIGS. 6b and 6c, the inner face 62 of the lower surface 22 has various support structures such as cylindrical portions 144 for receiving the screws 60 from the outer face 20. One such cylindrical portion 144a extends from the stop support bar 132.

The inner face of the upper surface (not shown) contains components for the display, a printed circuit board or substrate carbon tracks and various other components. A hard plastic surface (not shown) is placed behind the circuitry, so that the spring 116 of the tilt stand control device 68 contacts (or biases against) the hard plastic surface instead of the circuitry or other components.

The tilt stand control device 68 fits within the housing 122 as follows. With the inner face 62 of the lower surface 22 facing upwards, and with the top surface of the tilt stand control device 68 facing the inner surface 22, the locking member 72 of the tilt stand control device 68 is pushed through the forward opening 136 of the housing 122, until the pivot indentations 106 of the tilt stand control device 68 pivotally engage the pivot axles 142 of the housing 122. In the embodiment shown in FIG. 6b, the locking member 72 of tilt stand control device 68 must be inserted into the forward opening 136 at such an angle so as to allow the cylindrical portion 144a to project through the oval bore 110 of the tilt stand control device 68.

From the position shown in FIG. 6b, the handle portion 70 of the tilt stand control device 68 is rotated into the housing 122. In the fully inserted position shown in FIG. 6c, the top surface of the device 68 rests against the stop support bar 132 of the housing 122. As well, preferably, the projection wall 134 of the stop support bar 132 rests against the floor of the indentation 100 of the device 68. In order to provide added friction of the indentation wall against the projection wall 134 to help the terminal 10 remain stable when a user depresses keys 16 on the terminal, as described above, one wall of the indentation preferably has the ribs 101 as shown in FIGS. 5a and 5c.

With the tilt stand control device 68 inserted into the lower surface 22 as described above and as shown in FIG. 6c, the upper surface 20 and the lower surface 22 are then connected by engaging the screws 60 from the lower surface 22 through the cylindrical portions 144 of the upper surface 20. When the upper surface 20 and lower surface 22 are connected, the spring 116 of the tilt stand control device 68 rests between the device 68 and the hard plastic surface (not shown) of the upper surface 20 described above, thereby biasing the device 68 away from the upper surface 20 and into the stop support bar 132.

Of course, there are many other techniques for pivotally connecting the tilt stand control device 68 to the housing 122. For example, the pivot indentations 106 on the tilt stand control device 68 could be located on the bottom surface 112 of the device 68 instead of on the forward surface and the pivot axles 142 of the housing 122 could be correspondingly located on the housing 122, underneath the device 68.

Figure 7A:
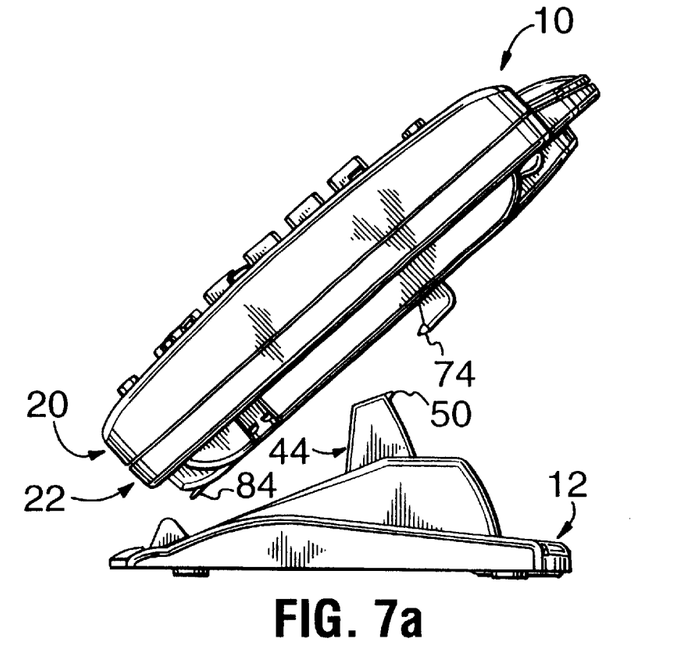
FIG. 7a is a side view of the terminal and the stand just prior to the terminal being pivotally connected to the stand.
Figure 7B:
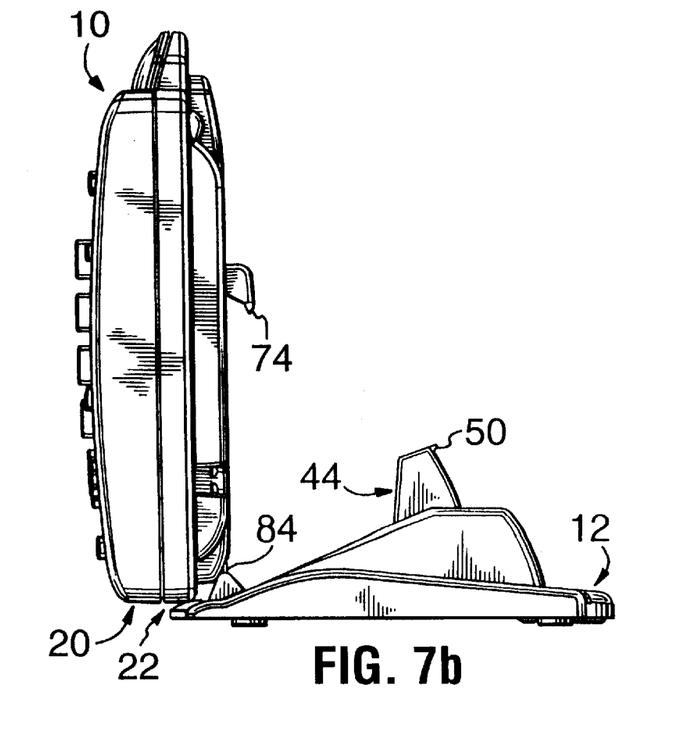
FIG. 7b is a side view of the terminal and the stand just as the terminal is pivotally connected to the stand.

To connect the terminal 10 to the stand 12, the lower surface 22 of the terminal 10 is placed above and to the rear of the stand 12 as shown in FIG. 7a and then the pivot prongs 84 of the terminal 10 are slid under the pivot rods 52 of the stand 12, as suggested in FIG. 7b, thereby pivotally connecting the terminal 10 to the stand 12. The terminal 10 is then pivoted or rotated towards the stand 12 (ie: the terminal 10 is rotated clockwise from the position shown in FIG. 7b).

Of course, there are many alternate ways of pivotally connecting the terminal 10 to the stand 12, such as, for example, by means of a hinge (not shown).

Figure 7C:
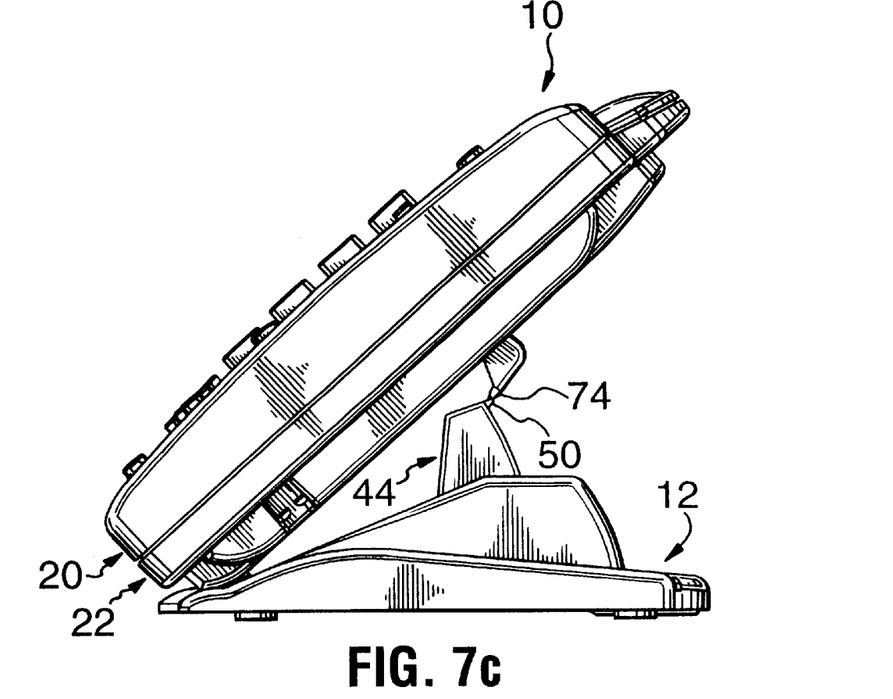
FIG. 7c is a side view of the terminal and the stand showing the terminal pivoted so that a central tooth contacts a top surface of the tilt unit.

If the tilt stand control device 68 is not depressed, the terminal 10 will be prevented from rotating further (clockwise) towards the stand 12 than the position shown in FIG. 7c where the central tooth 74 of the tilt stand control device 68 encounters a top edge of the tilt unit 44 and/or the outer teeth 76 of the device 68 encounter the stops 50 of the tilt unit 44.

Figure 7D:
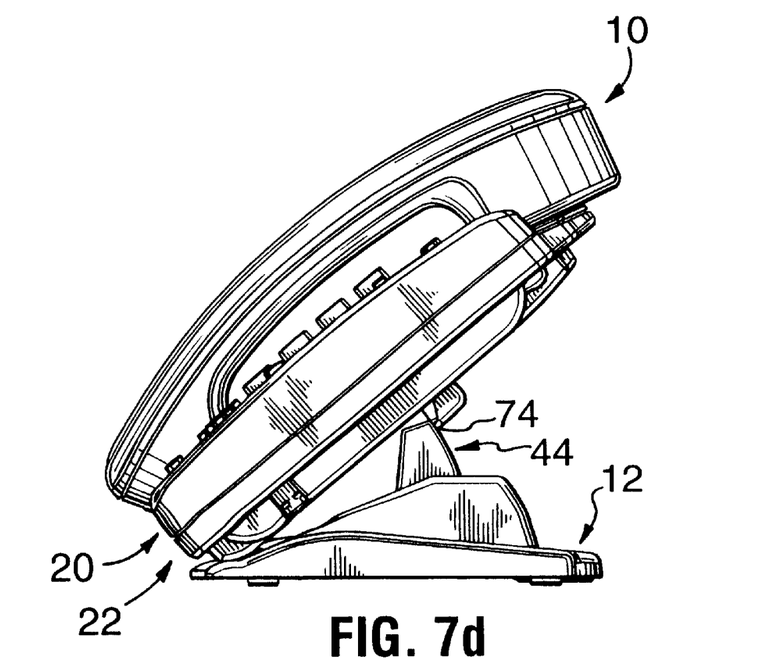
FIG. 7d is a view similar to the side view of FIG. 7c except that the central tooth has been lowered below the top surface of the tilt unit.

In order to rotate the terminal 10 closer to the stand 12, the user must depress the handle portion 70 of the tilt stand control device 68, causing the device 68 to pivot or rotate from its pivot indentations 106 about the pivot axles 142 of the housing 122, thereby causing the device 68 and hence the teeth 74, 76 to rotate counterclockwise from the position shown in FIG. 7c. When the handle portion 70 of the device 68 is sufficiently depressed, the teeth 74, 76 of the device 68 are rotated sufficiently to avoid the top edge and the stops 50 of the tilt unit 44. Once the teeth 74, 76 are lowered below the stops 50, the handle portion 70 of the tilt stand control device 68 may be released, engaging the central tooth 74 of the device 68 into a serration 48 of the tilt unit 44, thereby maintaining the terminal 10 at a particular angle with respect to the base 24 of the stand 12, as shown in FIG. 7d.

To change the angle of the terminal 10, the user depresses the handle portion 70 of the device 68 until the central tooth 74 is disengaged from a serration 48 and the terminal 10 is raised or lowered as desired until the preferred angle is achieved. The handle portion 70 of the device 68 is then released, thereby causing the central tooth 74 to engage a serration 48 at the desired angle.

The spring 116 used in the tilt stand control unit 68 is constructed such that it is relatively easy for the user to depress the handle portion 70 of the device 68 to disengage the central tooth 74 of the device 68 from a serration 48 in the tilt stand 12. However, it should preferably be increasingly difficult for the user to depress the handle portion 70 further.

When the handle portion 70 of tilt stand control device 68 is depressed sufficiently so that the central tooth 74 of the device 68 disengages the serrations 48, the central tooth 74 can be pivoted or rotated along the tilt unit 44 from any position between the base of the tilt unit 44 and the stops 50. When the central tooth 74 is positioned near the stops 50 of the tilt unit 44 as shown in FIG. 7d, the terminal 10 cannot be raised higher because the outer teeth 76 of the device 68 are blocked from being raised by the stops 50. This feature prevents the user from inadvertently rotating the teeth 74, 76 above the top of the tilt unit 44.

In order for the outer teeth 76 to be able to rotate above the stops 50, the user must depress the handle portion 70 of the device 68 further than was necessary to merely disengage the serrations 48. Since the biasing force of the spring 116 increases as the handle portion 70 of the device 68 is depressed, the user is unlikely to inadvertently depress the handle portion 68 more than necessary.

As well, as shown in FIGS. 5a and 5c, the handle portion 70 of the device 68 gently slopes upwardly from the sides towards handle projection 96, where the user is most likely to apply pressure to depress the handle portion 70. When the handle portion 70 is disengaged, the handle projection 96 projects below the lower surface 22 of the terminal 10. In order to rotate the outer teeth 76 of the device 68 sufficiently to avoid the stops 50 of the tilt unit 44, the handle portion 70 of the device 68 must preferably be sufficiently depressed so that the handle projection 96 of the device 68 is almost flush with the lower surface 22 of the terminal 10 or possibly even within the lower surface 22 of the terminal 10. Since it is somewhat difficult to depress the handle portion 70 to this extent due to the biasing force of the spring 116 and due to the fact that the user will feel the presence of the lower surface 22 of the terminal 10 against the finger used to depress the handle portion 70, it is unlikely that the user will inadvertently depress the handle portion 70 sufficiently to allow the outer teeth 76 to avoid the stops 50 of the tilt unit 44.

If a spring 58 is used between the stand 12 and the terminal 10 (the spring 58 would preferably be located within the spring receiving indentation 56 of the stand 12 as described above), there will be a biasing force on the terminal 10 away from the stand 12. This biasing force may help a user adjust the angle of the terminal 10 with one hand, without the need for two hands.

With the embodiment shown in FIGS. 2 and 3a, the range of possible angles of the terminal 10 with respect to the base 24 of the stand 12 is from approximately 22 degrees to approximately 45, these being the preferred range of angles for typical users. Of course, the range of angles can be increased or decreased with modifications to stand 12 and the terminal 10.

The stand 12 shown in FIGS. 2, 3a and 3b incorporates the primary raised portion 26 having sloping surface 28. When the locking member 72 of the device 68 is at its lowest position with respect to the tilt unit 44, as shown in cross-section in FIG. 7e, the angle of the terminal 10 is approximately 22 degrees with respect to the base 24 of the stand 12. 22 degrees is also preferably the approximate angle of the sloped section 28 of the primary raised section 26 of the stand 12.

The slope of the sloped section 28 of the stand 12 could be increased, reduced or even eliminated and the height of the tilt unit 44 could be increased, decreased or maintained, as desired. If the slope of the primary raised section 26 is reduced or eliminated, then of course, the shapes of the modules and interface device described above would have to be modified accordingly or eliminated. As well, if the height of the tilt unit 44 is increased, then the depth of the tilt unit receiving indentation 72 within the lower surface 22 of the terminal 10 would have to be increased accordingly.

Moreover, the distance between the serrations 48 on the tilt unit 44 can be increased or decreased to increase or decrease the number of different possible angles between the terminal 10 and the base 24 of the stand 12. Further, instead of serrations 48, the tilt unit 44 could incorporate a rubber material (not shown) of sufficient friction and hardness to support the terminal 10 when the cental tooth 74 of the device 68 is released to engage the rubber. In this case, the locking member 72 could also be modified to be made of a rubber material and its area could be increased to ensure solid engagement with the rubber on the tilt unit 44.

Figure 7E:
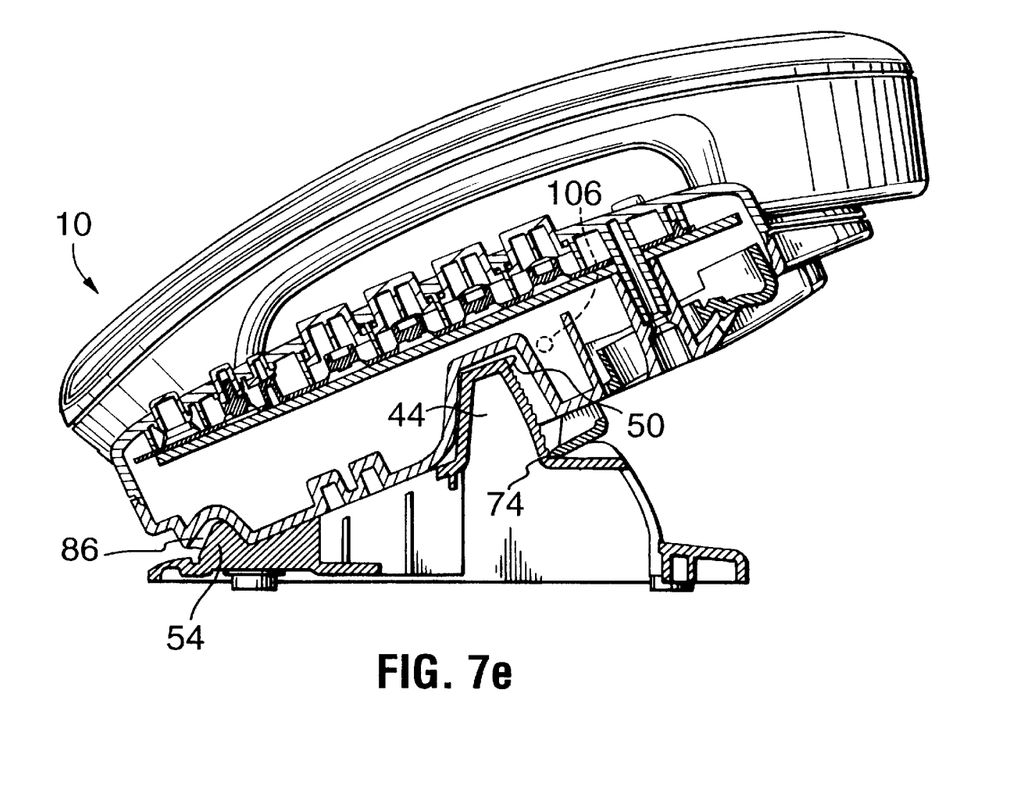
FIG. 7e is a sectional view along line 7e—7e of FIG. 1, when the terminal is in the fully lowered position.

It should be noted that there are several features which help stabilize the terminal 10 at any given angle with respect to the stand 12. One feature, as noted above, is the ribs 101 on one wall of indentation 100. Another feature to help stabilize the stand, which will be described with reference to FIG. 7e, relates to the relative distance from the pivot means 52, 84 (which is approximately where the projecting portion 54 is in FIG. 7e) to the central tooth 74 as opposed to the distance from the pivot means 52, 84 (approximately where portion 54 is) to the pivot indentation 106 of the tilt stand control device 68, as shown in dotted outline in FIG. 7e. Because the distance from the pivot means 52, 84 to the tooth 74 is less than the distance from pivot means 52, 84 to the pivot indentation 106, when pressure is applied to the upper surface 20 of the terminal 10 (for example, when a user depresses the keys 16) the tooth 74 is rotated clockwise as seen in FIG. 7e, thereby forcing the tooth 76 further (if possible) into its current serration 48. This feature may be referred to as a "self-tightening" feature, and helps to ensure that the stand is stable when the user depresses the keys 16.

Preferably, however, the relative distances described in the previous paragraph, in addition to the angle of the serrations 48 and the nature of the molded plastic forming these components, allow the tooth 74 to slip downwards into a lower serration 48 if too much force is exerted onto the upper surface 20 of the terminal 10 if, for example, a user slaps a hand onto the terminal or if the terminal is inadvertently dropped. This feature helps prevent breakage or damage to the tooth 74 and/or the serrations 48.

Numerous modifications and variations of the present invention are possible in light of the above teachings. It is therefore to be understood that within the scope of the appended claims, the invention may be practised otherwise than as specifically described herein.

What is claimed is:

1. A combination of a desktop terminal and a tilt stand allowing adjustment of the angle of the terminal, wherein the tilt stand comprises:
    a base having a front edge and a rear edge;
    a tilt unit extending upwardly from the base;
    friction means extending along the tilt unit; wherein the terminal comprises:
    a body having an upper surface, a lower surface, a front edge and a rear edge;
    the body being pivotally connected to the base proximate to the front edge of the housing and the front edge of the base;
    the terminal further comprising:
    an indentation in the lower surface receiving an upper portion of the tilt unit;
    a locking member engageable with the friction means to retain the housing at a plurality of pivoted positions; and
    a manually operable actuating member for selectively operating the locking member to cause the locking member to retain the body at a desired one of the plurality of pivoted positions.

2. The combination of claim 1 wherein the friction means comprises a plurality of horizontal recesses provided at spaced locations along the tilt unit.

3. The combination of claim 2 wherein the locking member comprises a central tooth projecting forwardly for engagement with the plurality of recesses.

4. The combination of claim 3 wherein the actuating member is located near the rear edge of the body.

5. The combination of claim 4 wherein the actuating member is located relatively centrally near the rear edge of the body.

6. The combination of claim 5 wherein the actuating member and the locking member protrude outwardly from the lower surface of the body.

7. The combination of claim 6 wherein the locking member and actuating member are located within a housing, the locking member being located forwardly of the actuating member.

8. The combination of claim 7 wherein the lower surface of the body further comprises a stop support bar located between the locking member and the actuating member.

9. The combination of claim 8 wherein the housing and locking member further comprise pivot means for pivotally connecting the locking member to the housing.

10. The combination of claim 9 wherein the actuating member and the locking member are integral with each other and wherein the terminal further comprises a biasing means for biasing the actuating member away from the upper surface of the terminal and into the stop control bar whereby depressing the actuating member pivots the central tooth rearwardly and releasing the actuating member pivots the central tooth forwardly.

11. The combination of claim 2 wherein the plurality of horizontal recesses extends from near a top of the tilt unit to near a bottom of the tilt unit.

12. The combination of claim 11 wherein the distance between adjacent recesses is such that the angle formed between the base of the stand and the terminal changes by approximately 2 degrees when the central tooth is moved from one recess to an adjacent recess.

13. The combination of claim 12 wherein the angle formed between the base of the stand and the terminal is approximately 22 degrees when the central tooth is in a recess closest to the base portion of the tilt unit and the angle is approximately 45 degrees when the central tooth is in a recess nearest the top of the tilt unit.

14. The combination of claim 13 wherein the plurality of horizontal recesses is located on a rear surface of the tilt unit.

15. The combination of claim 14 wherein the rear surface of the tilt unit curves forwardly from the bottom of the tilt unit to the top of the tilt unit.

16. The combination of claim 15 wherein the locking member further comprises one or more outer teeth adjacent the central tooth and protruding less far forwardly than the central tooth and the tilt unit further comprises one or more stops protruding rearwardly from the rear surface at or near the top wherein when the central tooth is pivoted just sufficiently to disengage a recess, the outer teeth are prevented from rotating past the stops due to insufficient clearance unless the actuating member is further depressed to further pivot the outer teeth rearwardly to clear the stops.

17. The combination of claim 1 wherein the body is pivotally connected to the base by pivot means comprising two or more raised pivot rods parallel to and located at or near the front edge of the stand and two or more forwardly projecting pivot prongs located on the lower surface of the body and at or near the forward edge the body whereby for pivotally connecting the terminal to the stand, each pivot prong is pivotally engaged to a corresponding pivot rod by placing, from the rear of the stand, each prong under its corresponding pivot rod.

18. The combination of claim 17 wherein the stand further comprises a forward projecting portion projecting outwardly from the stand and located parallel to and near the front edge of the stand, the forward projecting portion supporting the raised pivot rods; and a forward projecting portion receiving indentation formed within the lower surface of the terminal and parallel to and near the front edge of the terminal and shaped to mate with the forward projecting portion of the stand.

19. The combination of claim 1 wherein the combination further comprises a biasing means located between the stand and the terminal for biasing the terminal away from the stand.

20. The combination of claim 1 wherein the tilt stand further comprises a primary raised section comprising a forward sloping surface extending from near the front edge of the stand, a flat surface and rearward sloping surface wherein the tilt unit rises from or near the flat surface of the primary raised section.

21. The combination of claim 20 wherein the rearward sloping surface comprises one or more openings for engagement with one or more accessory connection modules, the forward sloping surface comprises an opening for engagement with an interface device for interfacing the modules with the terminal and the inner surface of the body further comprises an input means for connecting with an output means of the interface device.

22. The combination of claim 1 wherein the terminal further comprises a spring for biasing the locking member into a first pivoted position for engaging the friction means, the locking member and the manually operable actuating member being pivotable by the manually operable actuating member against the spring to a second pivoted position for disengaging the locking member from the friction means of the tilt stand.

23. A tilt stand for use in combination with a desktop terminal of the type comprising a body having an upper surface, a lower surface, a front edge and a rear edge, an indentation in the lower surface, a locking member for retaining the housing at a plurality of pivoted positions, and an actuating member for selectively operating the locking member to cause the locking member to retain the body at a desired one of the plurality of pivoted positions, wherein the tilt stand comprises:

a base having a front edge and a rear edge;

a tilt unit extending upwardly from the base and having an upper portion for reception in the indentation in the terminal;

friction means extending along the tilt unit for engagement by the locking member;

the front edge of the base being pivotally connectable to the front edge of the terminal.

24. The tilt stand of claim 23 wherein the friction means comprises a plurality of horizontal recesses provided at spaced locations along the tilt unit.

25. The tilt stand of claim 24 wherein the plurality of horizontal recesses extends from near a top of the tilt unit to near a bottom of the tilt unit.

26. The tilt stand of claim 25 wherein the distance between adjacent recesses is such that the angle formed between the base of the stand and the terminal changes by approximately 2 degrees when the locking member is moved from one recess to an adjacent recess.

27. The tilt stand of claim 26 wherein the angle formed between the base of the stand and the terminal is approximately 22 degrees when the locking member is in a recess closest to the bottom of the tilt unit and the angle is approximately 45 degrees when the locking member is in a recess nearest the top of the tilt unit.

28. The tilt stand of claim 27 wherein the friction means is located on a rear surface of the tilt unit.

29. The tilt stand of claim 28 wherein the rear surface of the tilt unit curves forwardly from the bottom of the tilt unit to the top of the tilt unit.

30. The tilt stand of claim 29 wherein the tilt unit, at or near its top surface, further comprises one or more stops protruding rearwardly.

31. The tilt stand of claim 30 wherein the tilt stand is pivotally connectable to the terminal by pivot means comprising two or more raised pivot rods parallel to and located at or near the front edge of the stand.

32. The tilt stand of claim 31 wherein the stand further comprises a forward projecting portion projecting outwardly from the stand and located parallel to and near the front edge of the stand, the forward projecting portion supporting the raised pivot rods.

33. The tilt stand of claim 23 wherein the tilt stand further comprises a primary raised section having a forward sloping surface extending from near the front edge of the stand, a flat surface and rearward sloping surface wherein the tilt unit rises from the flat surface of the primary raised section.

34. The tilt stand of claim 33 wherein the rearward sloping surface comprises one or more openings for engagement with one or more accessory connection modules, the forward sloping surface comprises an opening for engagement with an interface device for interfacing the modules with the terminal.

35. A desktop terminal for use with a tilt stand allowing adjustment of the angle of the terminal, wherein a lower surface of the terminal is adapted to cooperate with a projecting portion of the tilt stand and the lower surface comprises a housing for a tilt stand control device, a tilt stand control device, and a spring, the tilt stand control device having a locking member engageable with the projecting portion of the tilt stand and a manually operable actuating member for selectively operating the locking member to retain the terminal at a desired one of a plurality of pivotable positions, the spring biasing the tilt stand control device into a first pivoted position in which the locking member is engaged with the projecting portion of the tilt stand, the tilt stand control device being pivotable by the manually operable actuating member against the spring to a second pivoted position in which the locking member is disengaged from the projecting portion of the tilt stand.

36. The desktop terminal of claim 35 wherein the housing is located near a rear edge of the lower surface of the terminal.

37. The desktop terminal of claim 36 wherein the housing comprises housing pivot means for pivotally connecting the locking member to the housing.

38. The desktop terminal of claim 37 wherein the housing pivot means comprises one or more pivot axles near a forward portion of the housing.

39. The desktop terminal of claim 37 wherein the lower surface of the terminal further comprises terminal pivot means for pivotally connecting the terminal to the tilt stand.

40. The desktop terminal of claim 39 wherein terminal pivot means comprise two or more forwardly projecting pivot prongs located on the lower surface at or near a forward edge of the lower surface.

41. The desktop terminal of claim 37 wherein the locking means of the tilt stand control device comprises a tooth projecting forwardly and wherein the distance from the terminal pivot means to the tooth is less than the distance from the terminal pivot means to the housing pivot means.

42. The desktop terminal of claim 35 wherein the lower surface of the terminal further comprises a stop support bar located between the locking member and the actuating member when the tilt stand control device is housed within the housing.

43. The desktop terminal of claim 42 wherein the stop support bar comprises a projection wall projecting from a forward edge of the stop support bar towards the housing, for reception within an indentation of the tilt stand control device.

44. The desktop terminal of claim 35 wherein when the tilt stand control device is housed within the housing, at least a portion of the locking member protrudes outwardly from the lower surface and at least a portion of the actuating member protrudes outwardly from the lower surface.

45. A desktop terminal for use with a tilt stand allowing adjustment of the angle of the terminal, wherein a lower surface of the terminal is adapted to cooperate with a projecting portion of the tilt stand and the lower surface comprises a housing for a tilt stand control device, the tilt stand control device having a locking member engageable with the projecting portion of the tilt stand and a manually operable actuating member for selectively operating the locking member to retain the terminal at a desired one of a plurality of pivotable positions, wherein the housing comprises housing pivot means for pivotally connecting the locking member to the housing and the housing pivot means comprises one or more pivot axles near a forward portion of the housing.

46. The desktop terminal of claim 45 wherein the desktop terminal further comprises a spring, the spring biasing the tilt stand control device into a first pivoted position in which the locking member is engaged with the projecting portion of the tilt stand, the tilt stand control device being pivotable by the manually operable actuating member against the spring to a second pivoted position in which the locking member is disengaged from the projecting portion of the tilt stand.

47. A desktop terminal for use with a tilt stand allowing adjustment of the angle of the terminal, wherein a lower surface of the terminal is adapted to cooperate with a projecting portion of the tilt stand and the lower surface comprises a housing for a tilt stand control device, the tilt stand control device having a locking member engageable with the projecting portion of the tilt stand and a manually operable actuating member for selectively operating the locking member to retain the terminal at a desired one of a plurality of pivotable positions, wherein the housing comprises housing pivot means for pivotally connecting the locking member to the housing and wherein the lower surface of the terminal further comprises terminal pivot means for pivotally connecting the terminal to the tilt stand and the terminal pivot means comprise two or more forwardly projecting pivot prongs located on the lower surface at or near a forward edge of the lower surface.

48. The desktop terminal of claim 47 wherein the desktop terminal further comprises a spring, the spring biasing the tilt stand control device into a first pivoted position in which the locking member is engaged with the projecting portion of the tilt stand, the tilt stand control device being pivotable by the manually operable actuating member against the spring to a second pivoted position in which the locking member is disengaged from the projecting portion of the tilt stand.

49. A desktop terminal for use with a tilt stand allowing adjustment of the angle of the terminal, wherein a lower surface of the terminal is adapted to cooperate with a projecting portion of the tilt stand and the lower surface comprises a housing for a tilt stand control device, the tilt stand control device having a locking member engageable with the projecting portion of the tilt stand and a manually operable actuating member for selectively operating the locking member to retain the terminal at a desired one of a plurality of pivotable positions, wherein the lower surface of the terminal further comprises a stop support bar located between the locking member and the actuating member when the tilt stand control device is housed within the housing.

50. The desktop terminal of claim 49 wherein the stop support bar comprises a projection wall projecting from a forward edge of the stop support bar towards the housing, for reception within an indentation of the tilt stand control device.

51. The desktop terminal of claim 49 wherein the desktop terminal further comprises a spring, the spring biasing the tilt stand control device into a first pivoted position in which the locking member is engaged with the projecting portion of the tilt stand, the tilt stand control device being pivotable by the manually operable actuating member against the spring to a second pivoted position in which the locking member is disengaged from the projecting portion of the tilt stand.

* * * * *